United States Patent [19]

Schank et al.

[11] 4,268,840
[45] May 19, 1981

[54] OPTICAL RECORDING MEMBER

[75] Inventors: Richard L. Schank; Gordon E. Johnson, both of Webster, N.Y.

[73] Assignee: Xerox Corporation, Stamford, Conn.

[21] Appl. No.: 61,203

[22] Filed: Jul. 27, 1979

[51] Int. Cl.³ ............... G01D 15/34; B32B 5/16; B32B 9/04; B32B 15/04
[52] U.S. Cl. ............... 346/135.1; 428/324; 428/447; 428/457
[58] Field of Search ............ 346/76 L, 135.1; 428/324, 447, 457

[56] References Cited

U.S. PATENT DOCUMENTS 3,665,483  5/1972  Becker et al. ............ 346/76 L X
3,990,084 11/1976  Hamisch et al. .......... 346/135.1 X
4,069,487  1/1978  Kasai et al. ............. 346/135.1 X
4,101,907  7/1978  Bell et al. .............. 346/76 L X

OTHER PUBLICATIONS

Bartolini et al., Optical Disk Systems Emerge, IEEE Spectrum, Aug. 1978, pp. 20-28.

Primary Examiner—George H. Miller, Jr.

[57] ABSTRACT

An optical recording member for storing data by the selective ablation of a layer of energy absorbing material by laser address including a layer of recording material and at least one layer of a polymeric material having a second order glass transition temperature less than 293° K. contiguous to at least one surface of the layer of recording material.

13 Claims, 3 Drawing Figures

OPTICAL RECORDING MEMBER

BACKGROUND OF THE INVENTION

This invention relates to an optical recording member for storing data by the selective ablation of a layer of energy absorbing material by laser address and more particularly, to a recording member having a layer of energy absorbing material and layer of a polymeric material contiguous recording layer.

Digital storage systems are known which utilize optical methods including a recording member wherein digital information is written by the selective ablation of an energy absorbing material which forms a part of the recording member. The ablation of the energy absorbing material is achieved by the relative motion between the recording member and a laser beam which is modulated by a signal representative of the information to be stored.

Recording members including a substrate, an energy absorbing layer, and a coating over the energy absorbing layer are known in the art. Such optical storage devices are extremely advantageous because of the large amount of information that can be stored in a relatively small physical area when compared with known storage methods such as, for example, magnetic tape.

A disadvantage of optical recording members such as the above is that uncoated energy absorbing layers are subject to physical damage because of handling under the conditions of use including wear, abrasion and the presence of unwanted dust and dirt particles. Because of the high density of the information being stored on the optical recording member, any foreign particle of dust or dirt can create a false signal which would be read as a bit of information stored in the device. For this reason, it is desirable to overcoat the recording layer prior to the storing of the digital data in the recording member. In one embodiment, polymeric overcoatings have been employed as protective layers over the recording member.

A disadvantage in the use of overcoatings in contact with the recording layer is that the energy requirements for marking the recording layer in accordance with the modulated signal imparted to the laser are greatly increased when the polymer coating is in place. Thus, in order to create an ablated portion of the recording member in accordance with a signal representing a bit of digital information, more energy must be imparted to the recording member than when no overcoat is employed. In general, an increase on the order of three or four times or higher is required in order to write the information into the recording member. The minimum amount of energy required to create the ablated pit in the recording member is termed the threshold energy. It is desirable to maintain this threshold as close to that required to ablate the recording layer disposed on a substrate without an overcoat being present.

Accordingly, it is a primary object of the present invention to provide an improved optical recording member into which information is written by the selective ablation of a layer of energy absorbing material.

SUMMARY OF THE INVENTION

In accordance with the invention, an optical recording member is provided for the storage of digital information by the selective ablation of a layer of energy absorbing material by laser address. The recording member includes a layer of an optical energy absorbing material and at least one layer of a polymeric material having a second order glass transition temperature (Tg) less than 293° K. contiguous to at least one surface of the layer of recording material. By utilization of the contiguous layer, the increase in threshold for marking the recording member is minimized.

A layer of polymeric material contiguous the recording layer may be contiguous one or both sides of the recording layer depending upon the structure of the optical recording member. In order to maintain the threshold as low as possible, it is essential that a layer of polymeric material having the Tg described be at least contiguous one surface of the recording layer. Generally, the recording layer overlies a substrate and the polymeric layer overlies the recording layer. In this instance, the polymeric layer also functions to protect the record layer during handling.

BRIEF DESCRIPTION OF THE DRAWINGS

Other objects and advantages of the present invention will become apparent from the following detailed description with reference to the drawings in which.

While the present invention will hereinafter be described in connection with the preferred embodiments thereof, it will be understood that it is not intended to limit the invention to those particular embodiments. On the contrary, it is intended to cover all alternatives, modifications and equivalents as may be included within the spirit and scope of the invention as defined in the appended claims.

DETAILED DESCRIPTION OF THE INVENTION

In accordance with this invention, there is provided an optical recording member for the storage of digital information by the selective ablation of a recording layer of energy absorbing material by laser address, wherein at least one surface of the recording layer is contiguous to a layer of a polymeric material having a second order glass transition temperature less than 293° K. It has been found that merely by coating of the recording layer with resinous polymeric materials generally, the threshold of the laser energy to mark the recording layer in accordance with the signal imparted to the laser is increased on the order of at least three times that required for marking the recording layer without the presence of an overcoat. On the other hand, it is desirable to utilize a coating on the recording layer because of the physical damage that can occur to the recording layer merely in the handling thereof and also to remove the problem of dust which is reproduced in the playback of the recording as noise.

When utilizing protective layers in accordance with this invention, the threshold is increased on the order of from about 0.4 to about two times the threshold of the recording layer without a protective layer being present.

Figure 1:
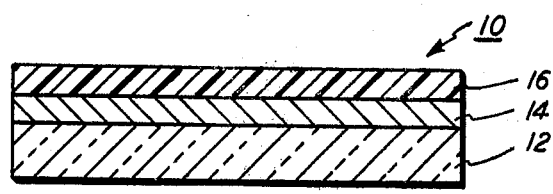
FIG. 1 is a cross section through a recording member in accordance with this invention.

Referring to FIG. 1, there is illustrated a recording member 10 having a substrate 12, an optical recording layer 14 and a layer 16 overlying and contiguous the recording layer 14. The substrate 12 may be any suitable material which may be either transparent or opaque depending upon the manner of the laser address and readout of the recording member 10. For example, if the readout of the recording member 10 is to be by transmission, it is necessary that both the substrate 12 and the protective layer 16 be transparent to the wavelength of the laser employed in the readout system. It is pointed out that the manner and means of marking the recording members and also for reading out the information imparted to the recording members in the marking process are known in the art and require no further explanation here. It is also to be understood that recording members which are read out by either transmissive or reflective techniques are well known in the art and require no further explanation with regard to the immediate invention. Thus, the substrate 12 may be any material such as, for example, glass, polymethylmethacrylate, polycarbonates, polyesters, polyethylene and polypropylene polymers, metals such as, for example, aluminum, nickel, stainless steel, and the like. As the material from which the substrate is employed is not critical to the invention it is to be understood that any material which performs the function of supporting the recording layer and which has the characteristics necessary for the manner of reading out the information on the recording layer is suitable.

Any suitable material capable of being ablated by absorbing optical energy from a laser source may be employed such as, for example, metals including tellurium, rhodium, bismuth, indium, lead, aluminum, platinum and the like; inorganic oxides, such as, for example, lead oxide, tungstun oxide, titanium oxide, silicon oxide, zirconium oxide and the like; chalcogen compounds containing a chalcogen element such as sulfur selenium and tellurium such as, for example chalcogenides of arsenic, antimony, phosphorous, germanium, silicon, thalium, indium, tin, copper, silver, iron, bismuth, aluminum, zinc and vanadium. Any of the oxides and chalcogenides set forth as suitable materials for the recording layer in U.S. Pat. No. 4,069,487 may be used as the recording layer in accordance with this invention. Tellurium is the preferred material for use in the optical recording members in accordance with this invention.

The recording layer may be applied to the substrate by suitable techniques known in the art such as, for example, sputtering, vacuum evaporation and the like. In a preferred embodiment, thin monolayers of tellurium are vacuum evaporated onto a polymethylmethacrylate substrate in a thickness of from about 75 angstroms to about 200 angstroms and most preferably about 150 angstroms.

The protective layer 16 may be prepared of any suitable polymeric material having a second order glass transition temperature less than about 293° K., such as, for example, poly(dimethylsiloxane), poly(heptymethyl) (2-phenylethyl) tetrasiloxane, poly(heptymethyl) (phenyl) tetrasiloxane, poly(heptymethyl) (trimethylsiloxy) tetrasiloxane poly(methyl) (3,3,3-trifluoropropyl) siloxane, poly(octylmethyltetrasiloxane), poly(phenyl) (methyl) siloxane, polytetramethyl (1,4-phenylene) disiloxanylene and the like; polyhalo olefins such as, for example, polytetrafluoroethylene, poly(1,1-dichloroethylene) poly(1,1-difluoroethylene) and the like; polymers formed by reaction of 4,4'-isopropylidene diphenol (bisphenol A) with methyl octyl dichloro silane and the like.

The layer 16 may be applied to the recording layer 14 by any suitable technique known in the art such as, for example, dipping, spin coating, by use of doctor blades and the like. While the thickness of the protective layer does not appear to be critical, it should be free of microscopic pinholes and also of a uniform nature in order to avoid any false signals upon readout of the optical recording member. For practical purposes, the thickness of the layer 16 may vary from 1 to 50 microns, preferably from 10 to 40 microns and most preferably from 10 to 20 microns.

In addition to the requirement that layer 16 have a second order glass transition temperature less than 293° K., it is a preferred embodiment that the second order glass transition temperature of the protective layer be less than 273° K. and most preferably less than 170° K. It is further preferred that the material from which the protective layer is formed, has a critical surface tension measured in dynes-cm$^{-1}$ less than 30 and preferably less than 28 dynes-cm. Thus, the most preferred embodiment is a tellurium recording layer 14 having a thickness of about 150 angstroms and a layer 16 of a polydimethylsiloxane having a thickness of 10–20 microns, the polymer having a second order glass transition temperature of about 150° K. and a critical surface tension of 24 dynes-cm$^{-1}$.

Figure 2:
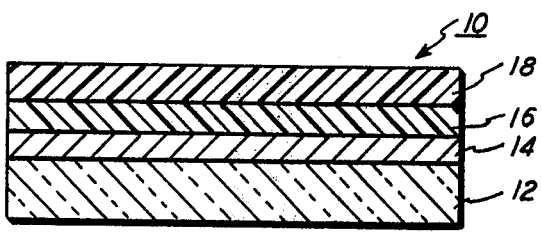
FIG. 2 is a cross section through another embodiment in accordance with this invention and FIG. 3 is a cross section through a third embodiment in accordance with this invention.

FIG. 2 represents another embodiment in accordance with this invention wherein the reference characters the same as that set forth in FIG. 1 have the same significance, the difference being that layer 16 has a tough polymeric layer 18 disposed on the surface opposite to that engaging the recording member 14 in order to provide resistance to damage of both the layer 16 and the recording layer 14 in actual use. The tough polymeric layer 18 may be any suitable polymeric material capable of withstanding normal handling conditions such as, for example, polycarbonate plastics, polyurethane plastics, high molecular weight polyesters, polyalkylene polymers such as, for example, polyethylene, polypropylene, polytetramethylene and the like, polyphenylene oxides, polyglycidyl ethers polyvinylchloride resins, polystyrene resins, polyacrylates including methylcrylic acid, polymethylmethacrylate, polyethylmethacrylate, polybutylmethacrylate, and the like; polyamides, and the like. It is pointed out that the nature of the protective layer 18 is such that it has properties which are resistant to everyday usage of the optical recording member in accordance with this invention and that no special requirements other than this are demanded. This layer 18 may be either transmissive, opaque or reflecting with respect to the laser wavelengths employed depending upon the nature of use of the optical recording member. For example, the second protective layer 18 must be transparent to the wavelength of laser light utilized if the readout of the optical recording device is by transmission or if either the marking or readout 18 from the protective layer side of the optical recording member. It is thus readily apparent that one or the other of either the substrate 12 or the layers 16 and 18 or both the substrate 12 and layers 16 and 18 be transparent depending upon the manner of use of the optical recording member.

Figure 3:
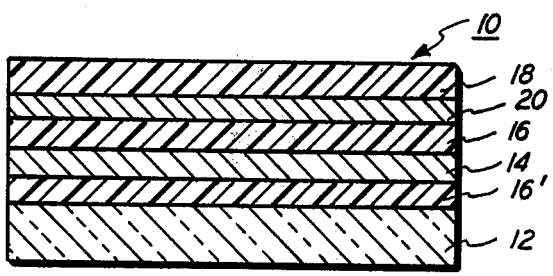

FIG. 3 represents still another embodiment in accordance with this invention wherein recording layer 14 is disposed between layers 16 and 16', each of which are contiguous and are of a polymeric material having a Tg less than 293° K. Layer 20 is a highly reflective layer such as, for example, aluminum, silver, nickel, chromium and the like. Protective layer 18 overlies the reflecting layer 20. In this embodiment the writing laser beam and the reading laser beam are directed at the optical recording member through the substrate 12 which must be transparent to the wavelength of the laser employed. In this embodiment, the layer 16 between the substrate 12 and the recording layer 14 is also transparent.

In accordance with this invention, it may be desirable to include in the polymeric material of layer 16 contiguous the recording layer 14 pigments or dyes, such as, for example, nonreinforcing carbon blacks, Sudan Black and the like.

The invention will be further illustrated by the following examples in which parts are by weight unless otherwise specified. In all of the examples the method of marking the sample to be tested and the apparatus employed in the tests are described generally as follows.

The test sample is a 150 Å thick film of tellurium vacuum evaporated onto a number 1½ Corning microscope cover slip. The cover slip has a thickness of 0.17 mm. Polymer overcoatings are applied to the tellurium films by dip coating to cover half of the tellurium film, the backside of the cover slip substrate being masked off to prevent polymer deposition on the glass. The polymer films are air dried and subsequently vacuum oven dried at about 60° C. for about 24 hours to remove residual solvent present. Film thickness is measured on a light section microscope and in each case is between about 10 and about 20 microns.

Testing of the above mentioned sample to determine the lowest energy required to produce a permanent ablated mark in the overcoated region ($E_o$) and in the bare tellurium region ($E_t$) is conducted with a pulsed nitrogen laser (Molection UV 400) pumped dye laser (Molection DL 200) as the write source. The dye laser provides a maximum output of about 300 microjoules per pulse with a pulse width of about 8 nsec. This laser pulse energy is orders of magnitude greater than necessary for the procedure being employed and consequently the raw laser beam is strongly attenuated prior to being processed to provide a Gaussian beam of the appropriate waist diameter to properly fill the entrance aperture of the final objective lens. The attenuation is conducted in a variable manner by a system of three linear polarizers. A rotatable, linear dichroic polarizing film is placed between two Glan-Thompson prism polarizers each of which is set to pass vertically polarized light. The intensity of the input light is varied by known amounts by rotating the dichroic filter with respect to the two fixed prism polarizers. The influence of the polymer overcoating on the threshold for marking the tellurium layer is determined on a relative basis by determining the lowest energy of which is responsible to record ablated bits, first on the bare tellurium and then on the polymer overcoated region of the same sample. Real time viewing of the recording surface is afforded by a closed-circuit television system consisting of a Sierra Scientific M600 Minicon camera and Model HD-1501 monitor. The objective lens is a Zeiss Plan-Neofluar 63 X/0.90, 160 mm conjugate, microscope objective lens having a negative lens of −150 mm focal length immediately preceding it in the light paths in order to transform the collimated write beam to one effectively focused about 160 mm away from the entrance aperture of the microscope objective, which objective lens, is designed for use with a microscope cover slip and can be fully corrected for cover glass thicknesses ranging from 0.11 to 0.22 mm. It is, of course, to be understood that suitable lasers of lower energy may be used in place of the system described above.

The results of the tests conducted in accordance with the foregoing description are set forth in Table I for each of the polymer materials indicated wherein the glass transition temperature ($T_g$) is set forth in degrees K, the critical surface tension ($\gamma_c$) is set forth in dynes-$cm^{-1}$. The ratio of the minimum energy requirements to mark the overcoated section and to mark the bare tellurium section is set forth in the column labeled $E_o/E_t$.

| EXAMPLES I–IVb | | | |
|---|---|---|---|
| Polymer | $T_g$ °K. | $\gamma$ c | $E_o/E_t$ |
| Poly(dimethylsiloxane)gum GE-SE-33 | 150 | 24 | 1.4 |
| Poly(dimethylsiloxane)gum GE-SE-33 laminated with a 1 mil free standing Mylar film | 150 | 24 | 1.4 |
| Reaction product of methyl octyl dichlorosilane and bisphenol A (see Example V below) | 263 | | 2 |
| Reaction product of methyl octyl dichlorosilane and bisphenol A (Example V) with a 1 mil free standing Mylar film | 263 | | 2 |
| (a) with 10% carbon black added | 263 | | 2 |
| (b) with 20% carbon black added | 263 | | 2 |

EXAMPLE V

About 45.6 parts (0.2 mols) of 4,4'-isopropylidene diphenol (bis-phenol A) in about 80 parts of dry benzine and 40 parts of dry pyrridene are charged to a reaction vessel equipped with a stirring means and a heating element. The contents are vigorously stirred at a temperature of about 40° to about 45° C. while adding dropwise about 46 parts (0.2 mol) of methyl octyl dichlorosilane. Heating and stirring are continued at 45° C. for an additional 15 minutes at which time the reaction mass is cooled to room temperature. Sufficient benzene is then added to bring the solids content to about 8 percent by weight and the mass is filtered to remove the salt. The polymer is then placed in a separatory funnel, washed successively with dilute hydrochloric acid, sodium bicarbonate and finally with plain water to a neutral pH. This solution is then dried over sodium sulfate overnight, filtered and the benzene is removed by vacuum stripping. The polymer is then placed in a vacuum oven at 100° C. for several hours and cooled room temperature. The resulting polymer exhibits a second order glass transition temperature of 263° K.

It is, of course, to be understood that the invention contemplates recording material on each side of a carrier or substrate to produce a twosided optical storage member having twice the data storage capacity. In this regard, it may be desirable to provide a reflecting surface on the substrate as the information readout, in such instances is by reflection rather than transmission. This type of recording member is well documented in the art and requires no further explanation here.

What is claimed is:

1. An optical recording member for storing data by the selective ablation of a layer of energy absorbing material by laser address comprising a recording layer of an optical energy absorbing material and at least one layer of a polymeric material having a second order glass transition temperature less than 293° K. contiguous to at least one surface of the layer of recording material.

2. The optical recording member of claim 1 wherin the layer contiguous the recording layer is polysiloxane resin.

3. The optical recording member of claim 1 wherein the second order glass transition temperature of the polmer forming the layer contiguous the recording layer is less than 170° K.

4. The optical recording member of claim 1 wherein the recording layer and the layer of polymeric material contiguous at least one surface of the recording layer are supported on a substrate.

5. The optical recording member of claim 1 wherein a layer of polymeric material having a second order glass transition temperature less than 293° K. is disposed contiguous both surfaces of the recording layer.

6. The optical recording member of claim 1 wherein a layer of polymeric material having a second order glass transition temperature less than 293° K. is disposed contiguous only one surface of the recording layer.

7. The optical recording member of claim 1 wherein the recording layer is sandwiched between the layer of polymeric material and a substrate.

8. The optical recording member of claim 1 wherein the second order glass transition temperature of the polymer forming the layer contiguous to the recording layer is less than 273° K.

9. The optical recording member of claim 1 or 8 wherein the polymer that forms the layer contiguous to the recording layer has a critical surface tension less than 30.

10. The optical recording member of claim 1 or 8 wherein a protective layer of a mechanically tough polymer overlays the layer contiguous the recording layer.

11. The optical recording member of claim 1 wherein the layer contiguous the recording layer is the reaction product of a siloxane and bisphenol A.

12. The optical recording member of claim 1 or 11 wherein the recording layer is tellurium.

13. The optical recording member of claim 12 wherein the recording layer has a thickness of from about 75 to about 250 angstroms.

* * * * *